(12) United States Patent
Asano et al.

(10) Patent No.: US 9,567,009 B2
(45) Date of Patent: Feb. 14, 2017

(54) VEHICLE-BODY FRONT STRUCTURE

(71) Applicant: MAZDA MOTOR CORPORATION, Hiroshima (JP)

(72) Inventors: Norio Asano, Hiroshima (JP); Shohei Yoshida, Hatsukaichi (JP); Fumitaka Andou, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/473,859

(22) Filed: Aug. 29, 2014

(65) Prior Publication Data

US 2015/0083514 A1 Mar. 26, 2015

(30) Foreign Application Priority Data

Sep. 20, 2013 (JP) ................................. 2013-194936

(51) Int. Cl.
| | |
|---|---|
| *B62D 21/11* | (2006.01) |
| *B62D 25/08* | (2006.01) |
| *B60G 3/20* | (2006.01) |
| *B60G 7/02* | (2006.01) |

(52) U.S. Cl.
CPC ............... *B62D 21/11* (2013.01); *B60G 3/20* (2013.01); *B60G 7/02* (2013.01); *B62D 25/082* (2013.01); *B62D 25/088* (2013.01); *B60G 2200/144* (2013.01); *B60G 2204/143* (2013.01)

(58) Field of Classification Search
CPC ..................................................... B62D 21/11
USPC ................. 180/311; 280/124.109, 781, 784; 296/193.07, 193.09, 203.01–203.03, 204
See application file for complete search history.

(56) References Cited

U.S. PATENT DOCUMENTS

| | | | | |
|---|---|---|---|---|
| 5,707,074 | A | * | 1/1998 | Kobayashi ......... B60G 21/0551 280/124.166 |
| 6,085,856 | A | * | 7/2000 | Law ................... B60G 21/0551 180/291 |
| 6,679,523 | B2 | * | 1/2004 | Yamamoto ............... B60G 7/02 180/311 |

(Continued)

FOREIGN PATENT DOCUMENTS

| | | |
|---|---|---|
| CN | 102343939 A | 2/2012 |
| JP | 2004-050993 A | 2/2004 |

(Continued)

OTHER PUBLICATIONS

Murata et al., Lower Body Structure of Vehicle, Feb. 19, 2004, JPO, JP 2004-050993 A, Machine Translation of Description.*

(Continued)

*Primary Examiner* — James English
(74) *Attorney, Agent, or Firm* — Studebaker & Brackett PC

(57) ABSTRACT

A vehicle-body front structure includes a tower portion comprising a pole portion which extends substantially vertically and a tower top portion which is positioned at an upper portion of the pole portion and projects from the pole portion longitudinally along a front side frame, constituting attachment portions of an upper arm of a front-wheel suspension. A stabilizer-support pedestal for supporting a stabilizer is provided to be connected to the pole portion and the tower top portion. Thus, the pole portion of the sub frame can be properly reinforced by using the stabilizer-support pedestal, so that the rigidity of the upper portion of the pole portion can be properly increased.

5 Claims, 16 Drawing Sheets

(56) References Cited

U.S. PATENT DOCUMENTS

| | | | |
|---|---|---|---|
| 8,490,988 B2* | 7/2013 | Takeshita | B62D 21/155 280/124.109 |
| 9,004,511 B1* | 4/2015 | Rosepiler | B60G 21/0551 280/124.109 |
| 2010/0032983 A1 | 2/2010 | Kusaka | |
| 2011/0316295 A1 | 12/2011 | Yamada et al. | |
| 2012/0187724 A1* | 7/2012 | Tomozawa | B62D 21/155 296/193.09 |
| 2013/0008735 A1* | 1/2013 | Hiramatsu | B62D 21/155 180/291 |
| 2013/0099461 A1* | 4/2013 | Otani | B60G 7/02 280/124.109 |
| 2014/0183833 A1* | 7/2014 | Takeshita | B62D 25/082 280/124.109 |
| 2015/0068832 A1* | 3/2015 | Rumpel | B60G 3/20 180/299 |
| 2015/0084375 A1* | 3/2015 | Asano | B62D 25/082 296/187.09 |

FOREIGN PATENT DOCUMENTS

| | | | | |
|---|---|---|---|---|
| JP | 2008-290539 A | 12/2008 | | |
| JP | 2010-036760 A | 2/2010 | | |
| JP | 2010-083258 A | 4/2010 | | |
| JP | 4910882 B2 | 1/2012 | | |
| JP | WO 2012001909 A1 * | 1/2012 | | B60G 7/02 |
| JP | 5211993 B2 | 3/2013 | | |

OTHER PUBLICATIONS

The First Office Action issued by the Chinese Patent Office on Mar. 29, 2016, which corresponds to Chinese Patent Application No. 201410432015.5 and is related to U.S. Appl. No. 14/473,859.

\* cited by examiner

VEHICLE-BODY FRONT STRUCTURE

BACKGROUND OF THE INVENTION

The present invention relates to a vehicle-body front structure, and specifically relates to a vehicle-body front structure which comprises front side fames extending in a vehicle longitudinal direction at right and left sides of an engine room, projecting forward from a vehicle-compartment portion, a sub frame provided at a bottom portion of the engine room, and a stabilizer. Herein, the above-described sub frame comprises a body portion which is comprised of right-and-left side portions constituting attachment portions of lower arms of a front-wheel suspension and a front side portion interconnecting the right-and-left side portions in a vehicle width direction, and a pair of tower portions provided to stand substantially vertically at right and left sides of the body portion and fastened to respective lower face portions of the front side frames at respective upper end portions thereof. The above-described stabilizer is provided forward of the above-described tower portions.

It is generally necessary that a front-wheel suspension comprises a stabilized having a torsional rigidity operative to restrain a vehicle from rolling improperly greatly when vehicle's one-side (right-side or left-side) wheels go up (bump) or go down (rebound). Japanese Laid-Open Publication No. 2004-50993 discloses a structure which comprises front side fames extending in a vehicle longitudinal direction at right and left sides of an engine room, projecting forward from a vehicle-compartment portion, a sub frame provided at a bottom portion of the engine room, and a stabilizer, wherein the above-described sub frame comprises a body portion which is comprised of right-and-left side portions constituting attachment portions of lower arms of a front-wheel suspension and a front side portion interconnecting the right-and-left side portions in a vehicle width direction, and a pair of tower portions provided to stand substantially vertically at right and left sides of the body portion and fastened to respective lower face portions of the front side frames at respective upper end portions thereof, and the above-described stabilizer is provided forward of the tower portions.

The above-described tower portion comprises a pole portion which extends vertically and a tower top portion which is positioned at an upper portion of the pole portion and constitutes an attachment portion of an upper arm of the front-wheel suspension. Herein, in the conventional structure disclosed in the above-described patent document, a pedestal for supporting the stabilizer is attached to the tower top portion only, the stabilizer-support pedestal has a pedestal face which slants forward and downward so as to face obliquely downward, and the stabilizer is supported at this pedestal face.

In the conventional structure disclosed in the above-described patent document, however, since the stabilizer-support pedestal is attached to the tower top portion only, there is a problem in that the above-described pole portion may not be reinforced properly with the stabilizer-support pedestal.

SUMMARY OF THE INVENTION

Accordingly, an object of the present invention is to provide a vehicle-body front structure which can properly reinforce the pole portion of the tower portion of the sub frame by using the stabilizer-support pedestal, thereby properly increasing the rigidity of the upper portion of the pole portion.

According to the present invention, there is provided a vehicle-body front structure, comprising a pair of right-and-left front side fames extending in a vehicle longitudinal direction at right and left sides of an engine room, projecting forward from a vehicle-compartment portion, a sub frame provided at a bottom portion of the engine room, the sub frame comprising a body portion which is comprised of right-and-left side portions and a front side portion and a pair of right-and-left tower portions, the right-and-left side portions constituting right-and-left attachment portions of right-and-left lower arms of a front-wheel suspension, the front side portion interconnecting the right-and-left side portions in a vehicle width direction, the pair of tower portions of the sub frame being provided to stand substantially vertically at right and left sides of the body portion and fastened to respective lower face portions of the pair of front side frames at respective upper end portions thereof, and a stabilizer provided forward of the pair tower portions, wherein each of the tower portions comprises a pole portion which extends substantially vertically and a tower top portion which is positioned at an upper portion of the pole portion and projects from the pole portion longitudinally along the front side frame, constituting an attachment portion of an upper arm of the front-wheel suspension, and a pedestal for supporting the stabilizer is provided to be connected to the pole portion and the tower top portion.

According to the present invention, since the stabilizer-support pedestal is provided to be connected to the pole portion and the tower top portion, the pole portion of the sub frame can be properly reinforced by using the stabilizer-support pedestal, so that the rigidity of the upper portion of the pole portion can be properly increased.

According to an embodiment of the present invention, the vehicle-body front structure further comprises a pair of right-and-left extension members which are configured to be joined to respective middle portions, in a height direction, of the pair of tower portions of the sub frame at respective rear end portions thereof and to project forward at a level below the pair of front side frames so as to deform and absorb an impact at a vehicle frontal collision, in cooperation with the pair of front side frames, and the stabilizer-support pedestal is arranged above the extension member and an pedestal face of the stabilizer-support pedestal is configured to face obliquely upward.

According to this embodiment, a resistant force against the vehicle-frontal collision can be improved by using both the front side frame and the extension member. Further, even in the case in which the extension member is configured to be joined to the middle portion, in the height direction, of the tower portion at the rear end portion thereof and project forward at the level below the front side frame, since the stabilizer-support pedestal is arranged above the extension member and the pedestal face thereof is configured to face obliquely upward, the stabilizer can be supported at an upper side of the pedestal face. Accordingly, the stabilizer can be properly arranged without interfering with the extension member.

According to another embodiment of the present invention, the tower top portion of the tower portion of the sub frame comprises a front member which has an L shape in a side view, a rear member which is positioned substantially symmetrically relative to the front member, a center member which has a U shape in a plan view which opens outward, in a vehicle width direction, and an upper member which constitutes an upper wall and an inward side wall, in the vehicle width direction, of the tower top portion, and the upper member of the tower top portion has an upper wall portion positioned at an upper end of the tower top portion and a side wall portion extending downward from an inward side of the upper wall portion, which is made of a sheet of panel.

According to this embodiment, a storage portion of an upper-arm pivot of the front-wheel suspension can be formed by minimum required members, i.e., the front member, the rear member, the center member, and the upper member. In particular, since the upper member has the upper wall portion and the side wall portion, which is made of a sheet of panel, the attachment rigidity of the upper arm can be ensured properly, reducing the parts number or assembling steps.

Other features, aspects, and advantages of the present invention will become apparent from the following description which refers to the accompanying drawings.

BRIEF DESCRIPTION OF THE DRAWINGS

FIG. 15A being a perspective view.

DETAILED DESCRIPTION OF THE INVENTION

Hereinafter, a preferred embodiment of the present invention will be described referring to the accompanying drawings.

Figure 1:
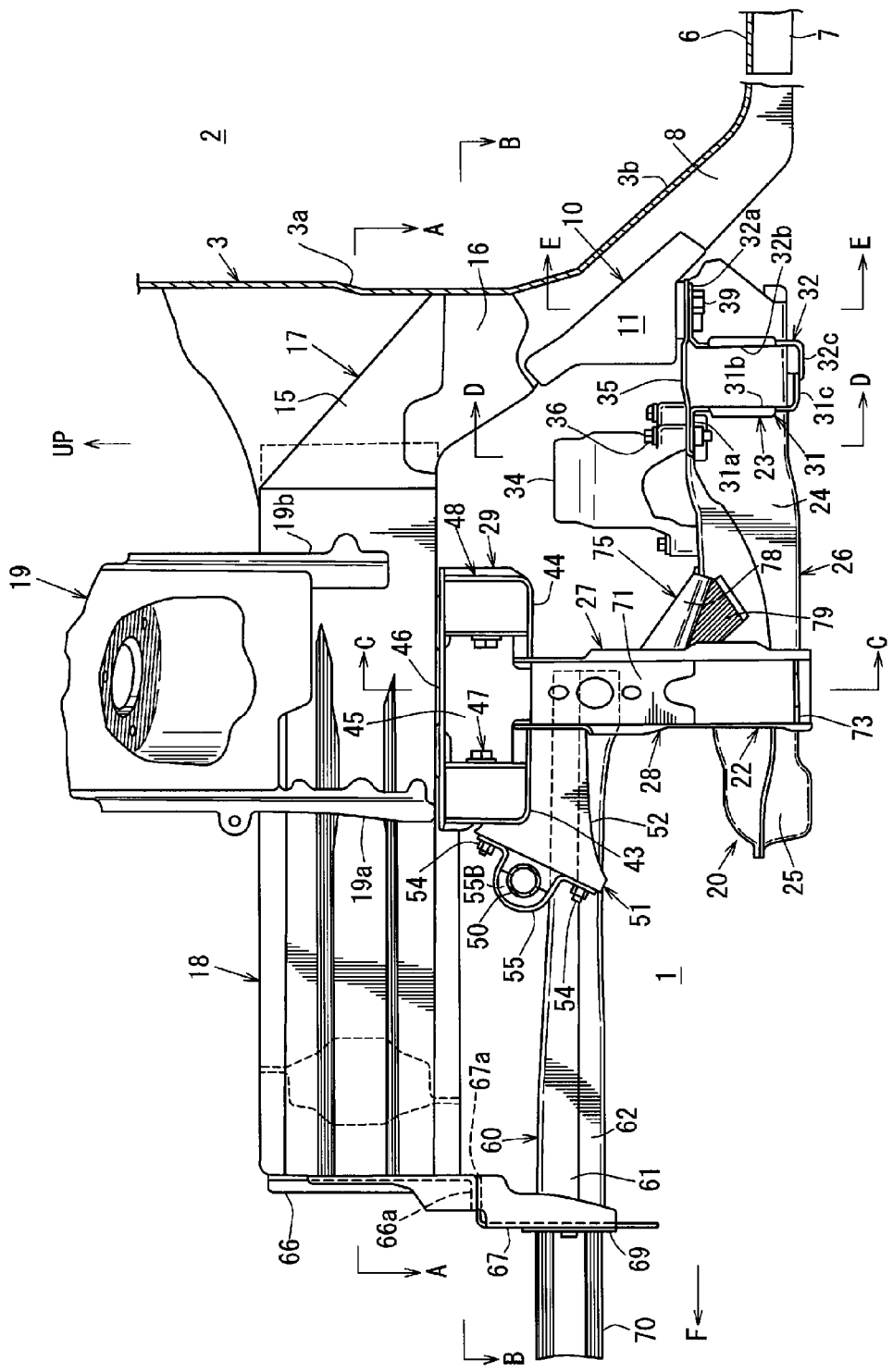
FIG. 1 is a side view showing a vehicle-body front structure of the present invention.
Figure 2:
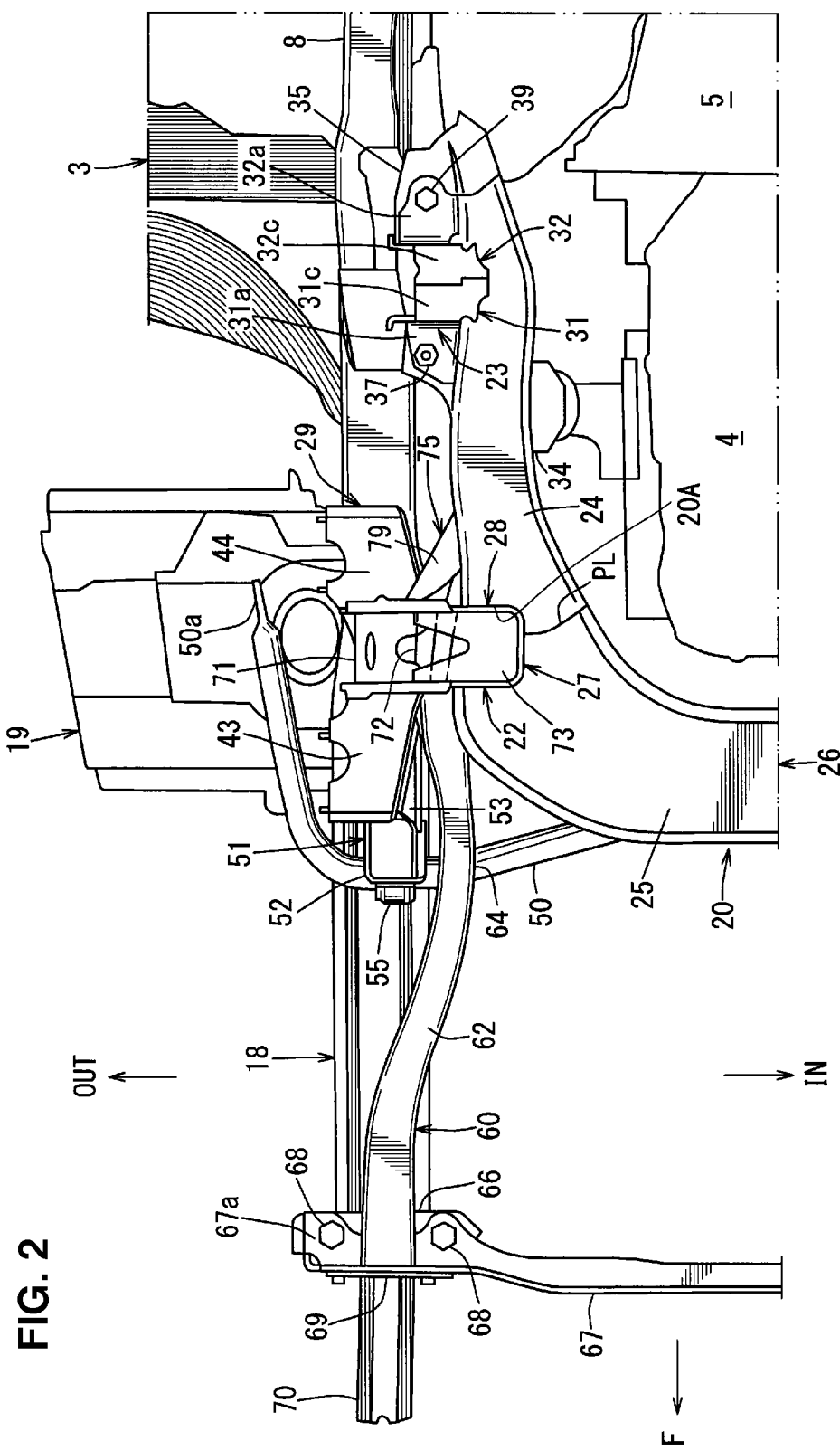
FIG. 2 is a bottom view showing the vehicle-body front structure.
Figure 3:
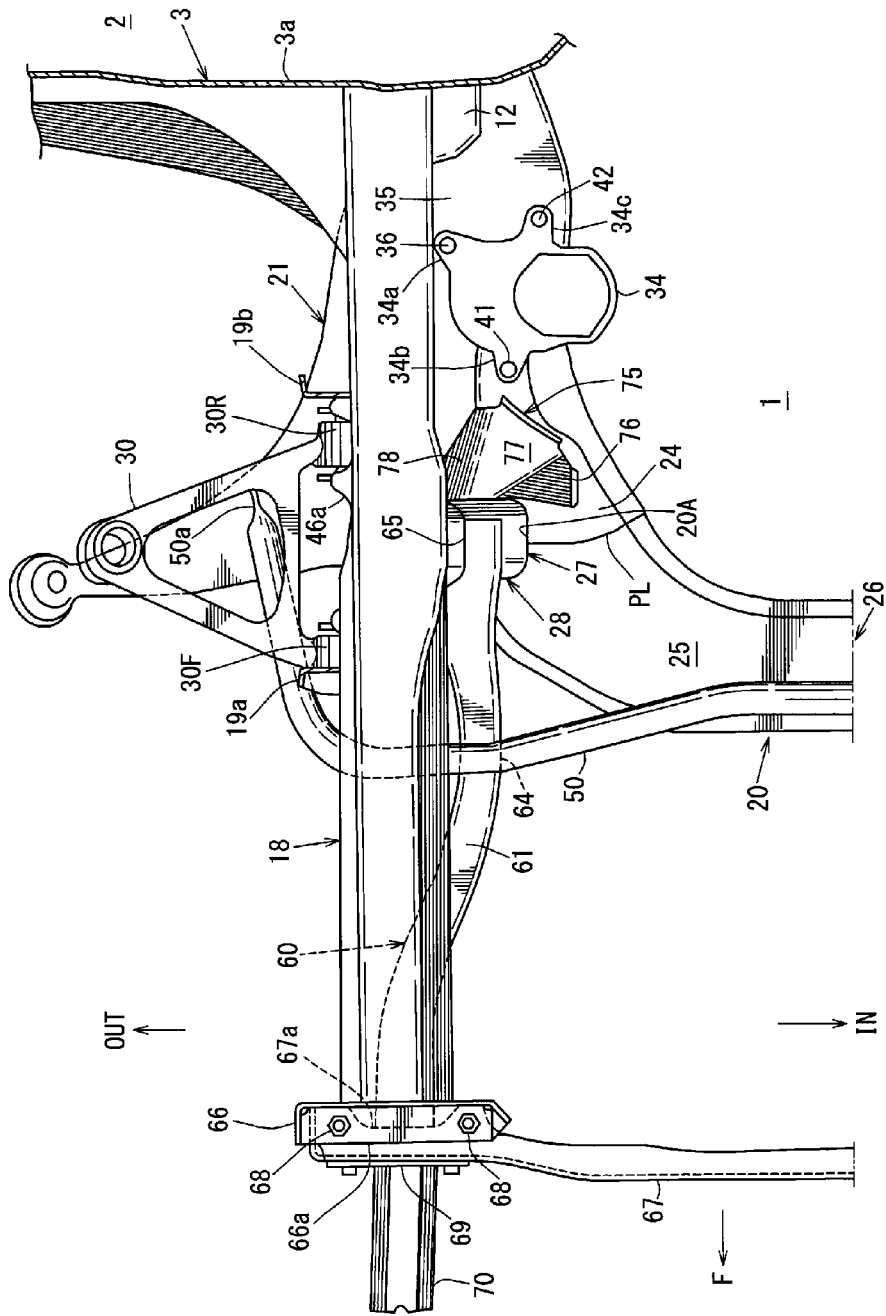
FIG. 3 is a plan view of a vehicle-right side, when viewed from line A-A of FIG. 1.
Figure 4:
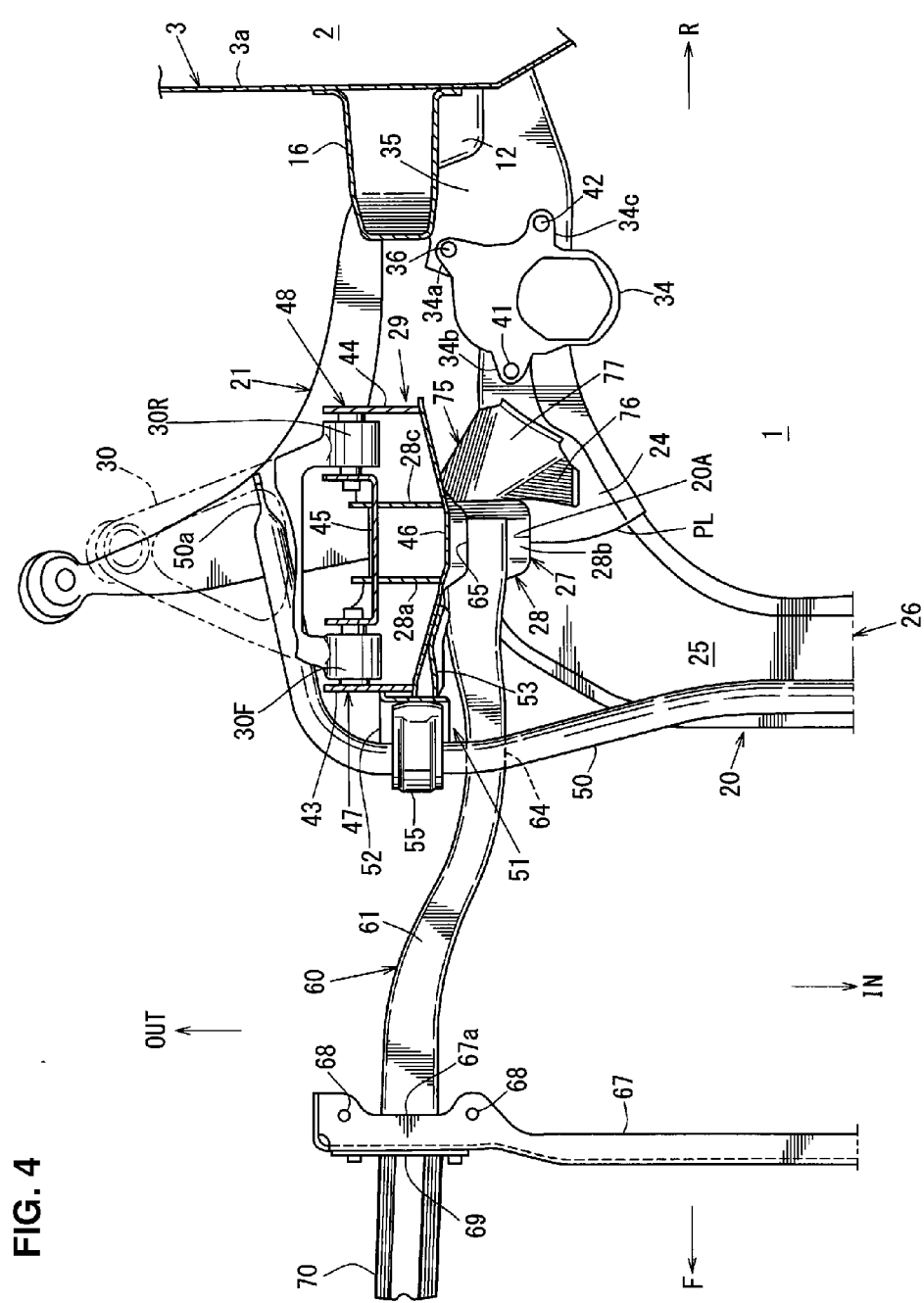
FIG. 4 is a plan view of the vehicle-right side, when viewed from line B-B of FIG. 1.
Figure 5:
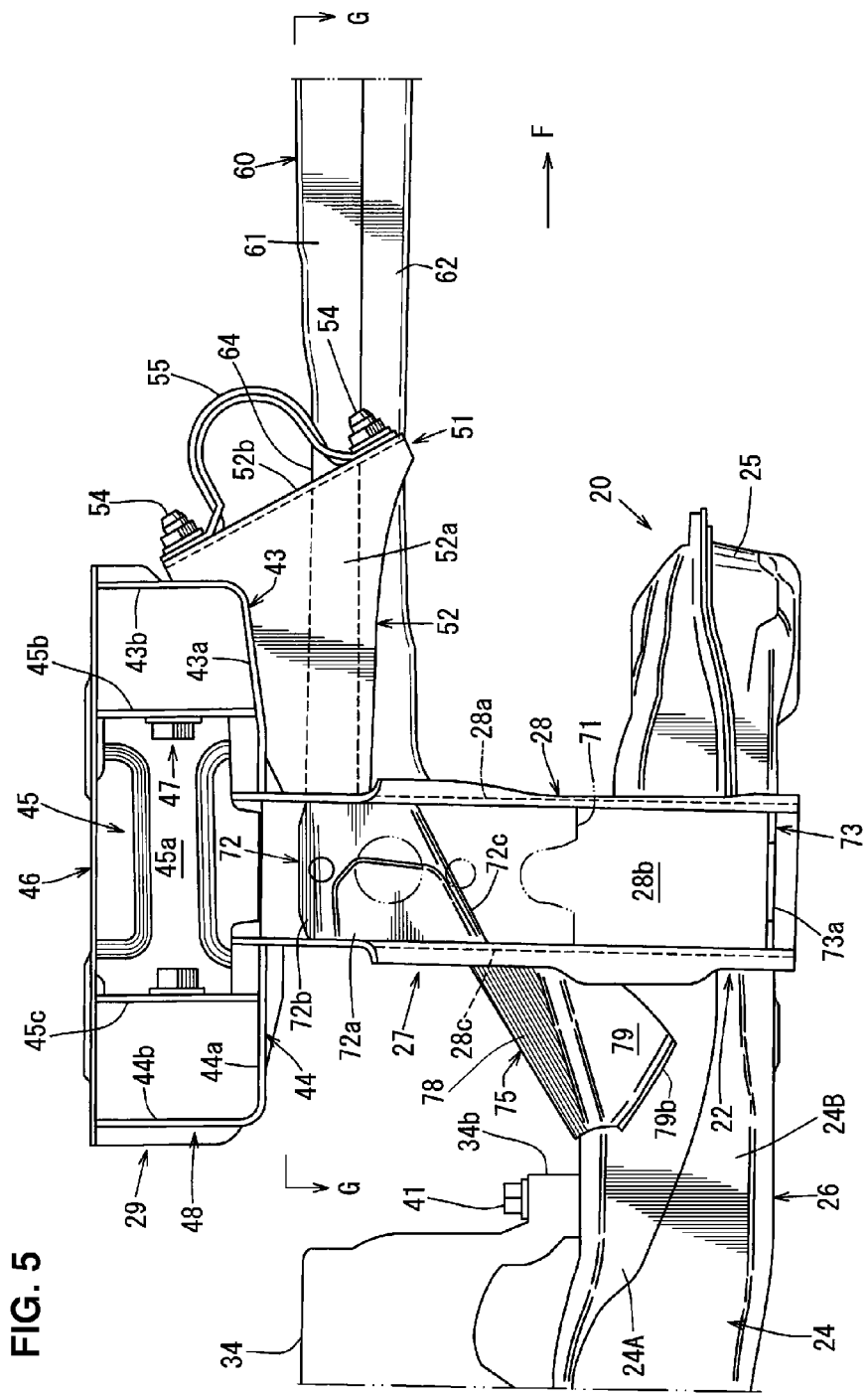
FIG. 5 is a major-part enlarged side view of the vehicle-right side.

The figures show a vehicle-body front structure. FIG. 1 is a side view showing constitution of a vehicle-left side of the vehicle-body front structure, FIG. 2 is its bottom view, FIG. 3 is a plan view of a vehicle-right side, when viewed from line A-A of FIG. 1, FIG. 4 is a plan view of the vehicle-right side, when viewed from line B-B of FIG. 1, and FIG. 5 is a major-part enlarged side view of the vehicle-right side. The vehicle-body front structure of the present embodiment is configured substantially symmetrically around a vehicle-center line.

In FIGS. 1-5, a dash lower panel 3 (dash panel) which partitions an engine room 1 and a vehicle compartment 2 in a vehicle longitudinal direction is provided. As shown in FIG. 2, the present embodiment uses a front-engine rear-drive type (FR) of vehicle. In the engine room 1, an engine 4 is arranged longitudinally, a transmission 5 is connected to a rear portion of the engine 4, and this transmission 5 is arranged below a floor tunnel portion.

As shown in FIG. 1, the above-described dash lower panel 3 comprises a vertical wall portion 3a which extends vertically and a slant portion 3b which slants downward and rearward from a lower portion of the vertical wall portion 3a, and a floor panel 6 is provided continuously from a lower end of the slant portion 3b. A floor frame 7 which has an inverse-hat-shaped cross section is jointly fixed to a lower face portion of the floor panel 6 so as to form a closed cross section extending in a vehicle longitudinal direction between the floor frame 7 and the floor panel 6. Thereby, the rigidity of a vehicle-body lower portion is increased.

Figure 14:
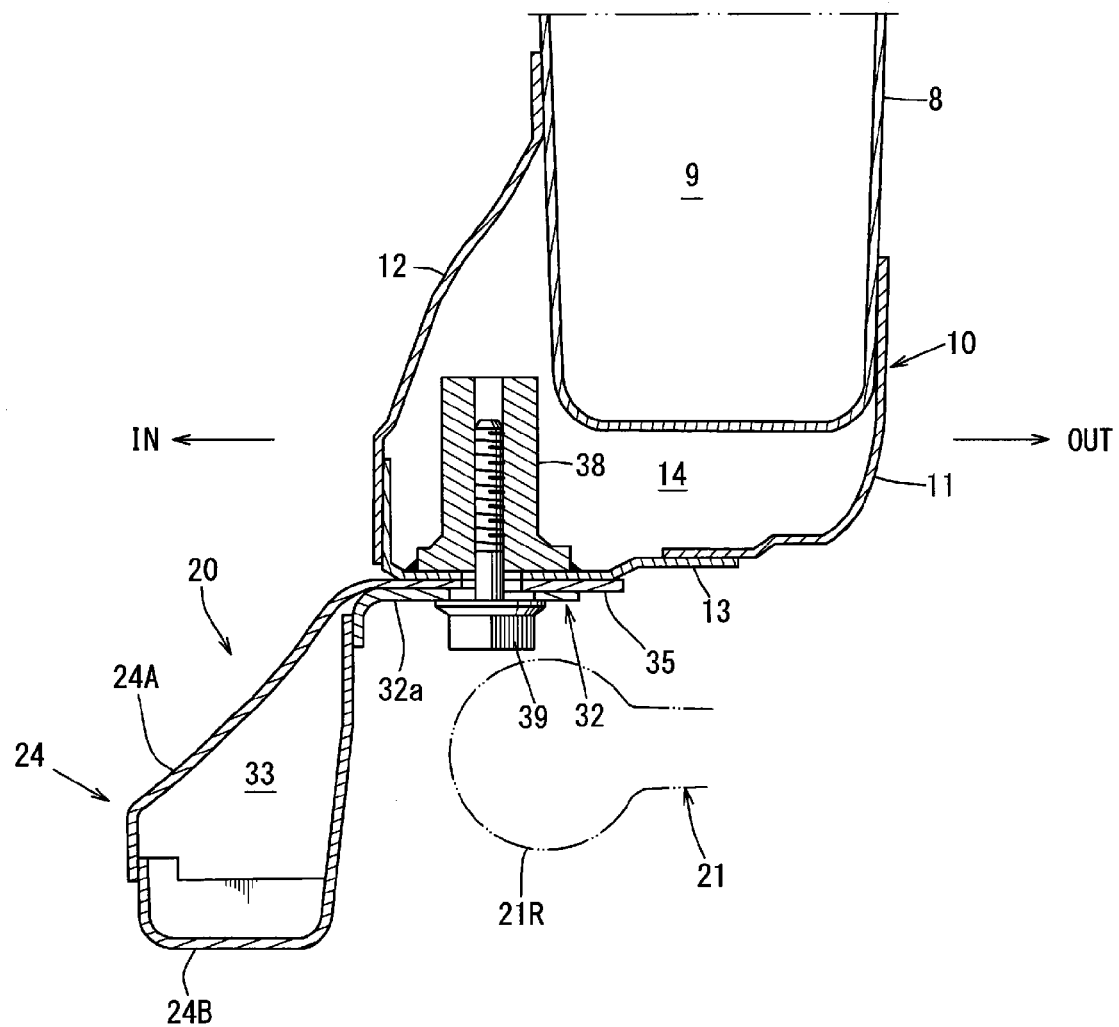
FIG. 14 is a major-part enlarged sectional view taken along line E-E of FIG. 1.

Further, a kick-up portion frame 8 is jointly fixed to a front lower portion of the slant portion 3b of the dash lower panel 3 so as to form a closed cross section 9 (see FIG. 14) between the kick-up portion frame 8 and the dash lower panel 3. A sub-frame attaching pedestal 10 is jointly fixed to a front-lower portion of the kick-up portion frame 8. This sub-frame attaching pedestal 10 comprises, as shown in FIG. 14, three members of an attaching pedestal outer 11, an attaching pedestal inner 12, and an attaching pedestal lower 13. As shown in this figure, a closed cross section 14 is formed between the sub-frame attaching pedestal 10 and the kick-up portion frame 8, so that the sub-frame attachment rigidity is increased.

Also, as shown in FIG. 1, a fillet member 17 which is comprised of two members of an upper-side fillet 15 and a lower-side fillet 16 is attached to a front portion of the vertical wall portion 3a of the dash lower panel 3. There are further provided a pair of front side frames 18 which extend in the vehicle longitudinal direction at right and left sides of the engine room 1, projecting forward straightly from the vertical wall portion 3a of the dash lower panel 3 via the fillet member 17. This front side frame 18 is a vehicle-body strengthening member having a longitudinally-extending closed cross section which is formed by a front side frame inner and a front side frame outer which are jointly fixed together. In the present embodiment, the front side frame 18 is formed in a cross cylindrical shape in its cross section in the vehicle width direction.

As shown in FIGS. 1-3, the front side frame 18, the kick-up portion frame 8, and the floor frame 7 are configured to extend straightly in a plan view. Moreover, as shown in FIGS. 1 and 2, a suspension tower portion 19 is provided at an outward side, in a vehicle width direction, of a longitudinally-middle portion of the front side frame 18 via front and rear leg portions 19a, 19b.

[Constitution of Sub Frame]

As shown in FIGS. 1-5, a sub frame 20 which is located at a bottom portion of the engine room 1 is provided. This sub frame 20 comprises a body portion 26 (a so-called sub frame body) which is comprised of right-and-left side portions 24 and a front side portion 25 and a pair of right-andleft tower portions 27. Each of the right-and-left side portions 24 constitutes attachment portions 22, 23 of a lower arm 21 (see FIGS. 3 and 4) of a front-wheel suspension (a wishbone type of suspension), and the front side portion 25 interconnects the right-and-left side portions 24 in the vehicle width direction. As shown in FIGS. 1 and 5, the pair of tower portions 27 are provided to stand substantially vertically at right and left sides of the body portion 26, respective upper end portions of which are fastened, with fastening members, not illustrated, to respective lower face portions of the pair of front side frames 18 at respective positions which correspond to the suspension tower portions 19. Respective rear portions of the right-and-left side portions 24 are fastened to the respective sub-frame attaching pedestals 10 (see FIG. 14) which are a bottom portion forward of the vehicle-compartment portion. Herein, each of the above-described tower portions 27 comprises a pole portion 28 which extends vertically and a tower top portion 29 which extends longitudinally along the front side frame 18 at an upper portion of the pole portion 28, projecting from the pole portion 28, and constitutes an attachment portion of an upper arm 30 (see FIGS. 3 and 4) of the front-wheel suspension.

Figure 6:
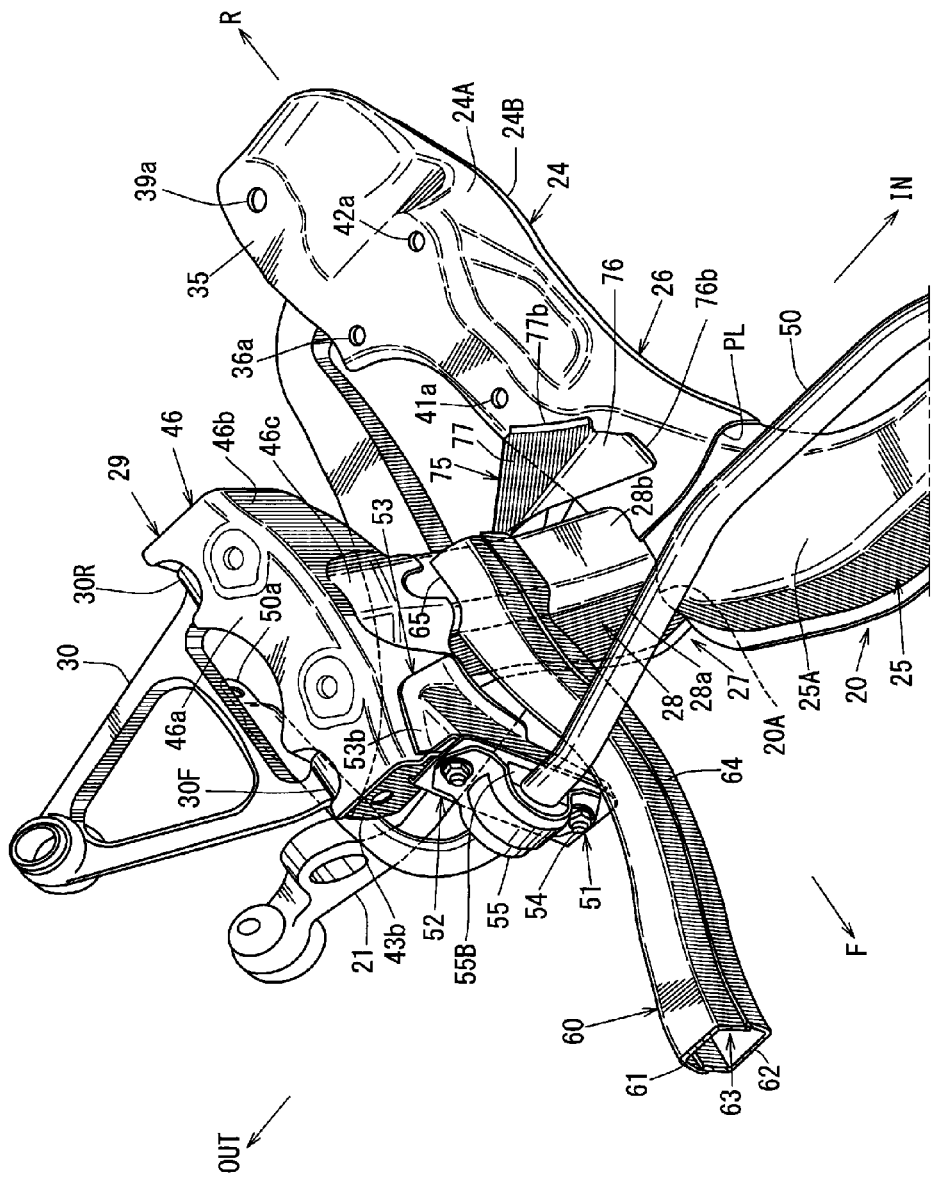
FIG. 6 is a perspective view of the vehicle-body front structure, when viewed obliquely from left, front and above.
Figure 7:
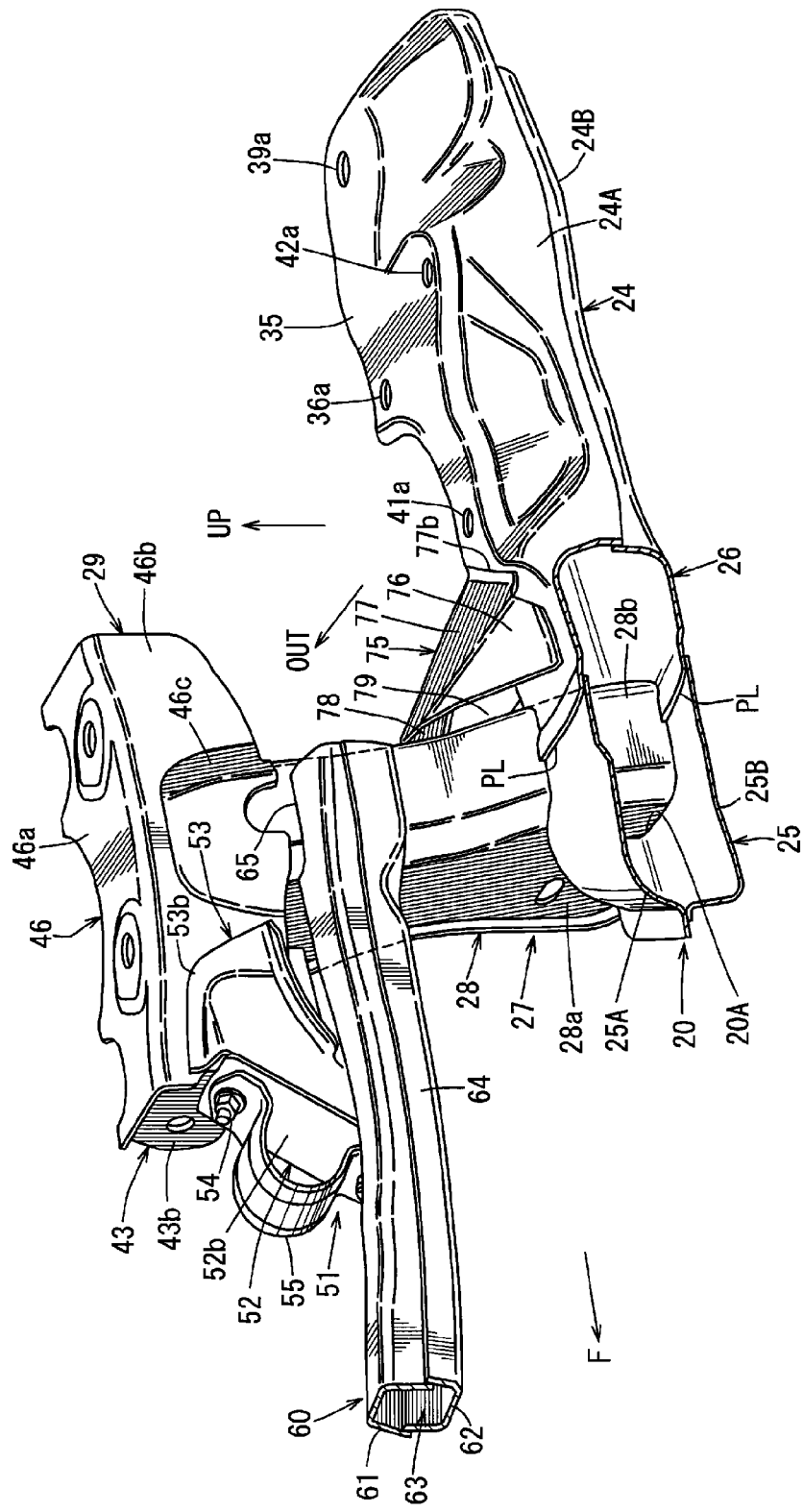
FIG. 7 is a perspective view of the vehicle-body front structure, when viewed obliquely from left and front.

FIGS. 6-9 are perspective views of the vehicle-body front structure, when viewed from different angles from each other. As shown in FIG. 7 particularly, each of the side portions 20 of the sub frame 20 is formed in a hollow shape, which is comprised of an upper-side member 24A and a lower-side member 24B. Likewise, the front side portion 25 of the sub frame 20 is formed in a hollow shape, which is comprised of an upper-side member 25A and a lower-side member 25B.

Figure 8:
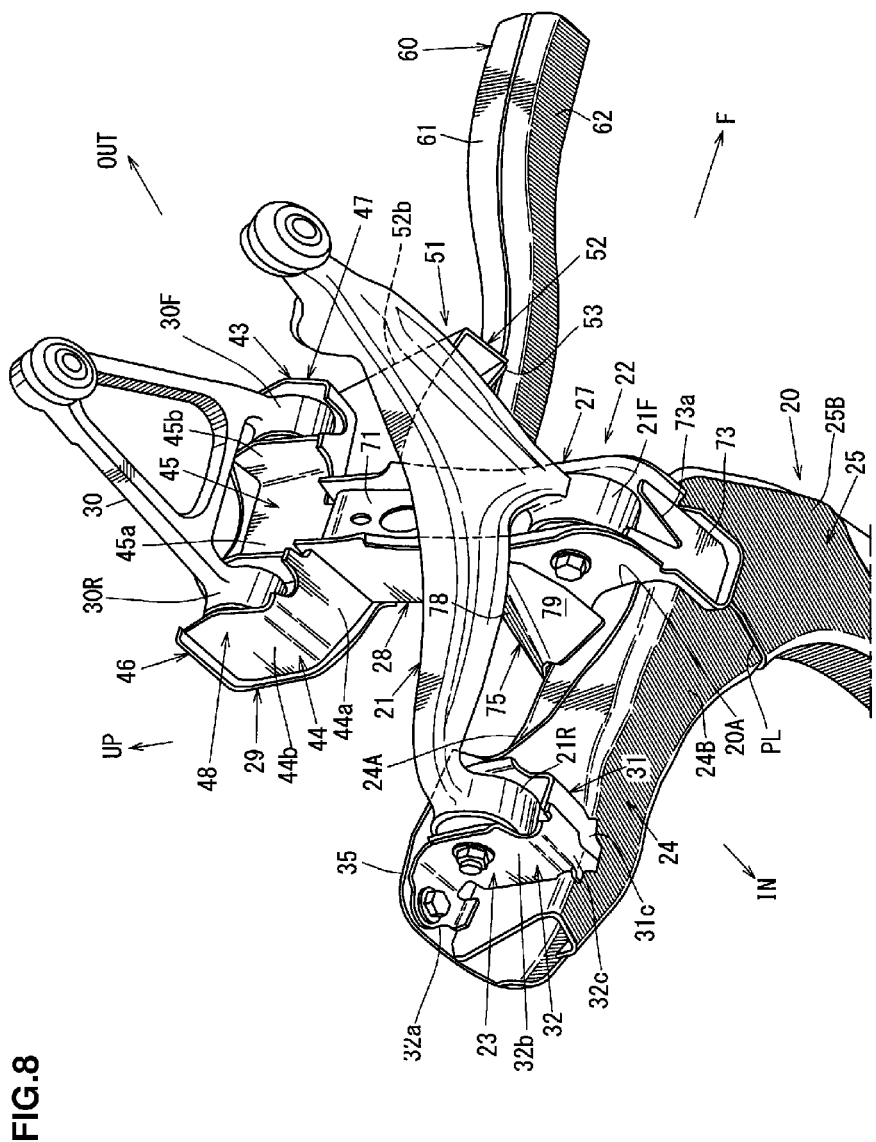
FIG. 8 is a perspective view of the vehicle-body front structure, when viewed obliquely from right, rear and below.
Figure 9:
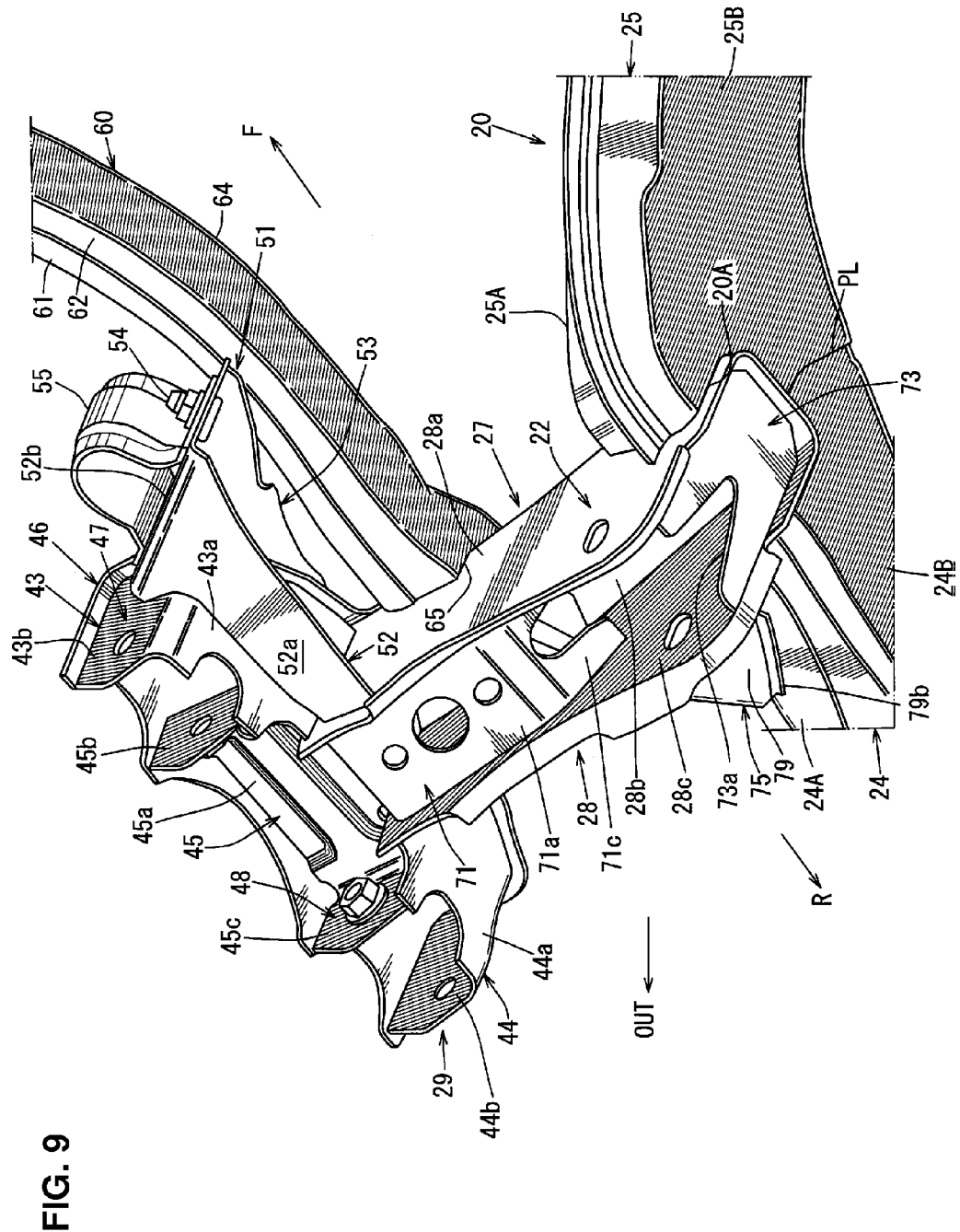
FIG. 9 is a perspective view of the vehicle-body front structure, when viewed obliquely from right, front and below.

Further, as shown in FIGS. 8 and 9, a split line PL between the side portion 24 and the front side portion 25 is formed at a position corresponding to the front-side attachment portion 22 of the lower arm 21 so that the sub frame 20 can be surely crushed at the attachment portion 22 at the vehicle frontal collision, thereby increasing energy absorption of the impact. The above-described split line PL is a split portion which is located at a longitudinally-middle position of a base portion of the tower portion 27, the side portion 24 and the front side portion 25 are longitudinally interconnected by this split line PL (the split portion), and this split line PL is formed at both the respective upper-side members 24A, 25A and the respective lower-side members 24B, 25B of the side portion 24 and the front side portion 25.

Further, as shown in FIGS. 7, 8 and 9, the tower portion 27 is connected such that an outer periphery of its base portion is stored in a sub-frame cut-out portion 20A which is formed at the side portion 24 of the sub frame 20 (including an end portion of the front side portion 25 in the present embodiment). The above-described sub-frame cut-out portion 20A is formed by cutting out part of respective outward end portions, in the vehicle width direction, of the upper-side member 24A and the lower-side member 24B of the side portion 24, which are located at the position of the split line PL as the split portion.

That is, since respective flanges of the upper and lower members 24A, 24B are connected, the strength of the above-described sprit line PL is generally increased. However, in the present embodiment, part of the respective outward end portions of these members 24A, 24B are cut out, and also the tower portion 27 having an outward-facing U-shaped cross section which is easily crushable longitudinally is connected such that the outer periphery of its base portion is stored in the sub-frame cut-out portion 20A. This connecting structure can cause a proper brakeage at the sprit line PL. Further, since both the upper and lower members 24A, 24B are connected at the split portion of the tower portion 27, the static rigidity of the tower portion 27 can be increased.

Figure 10:
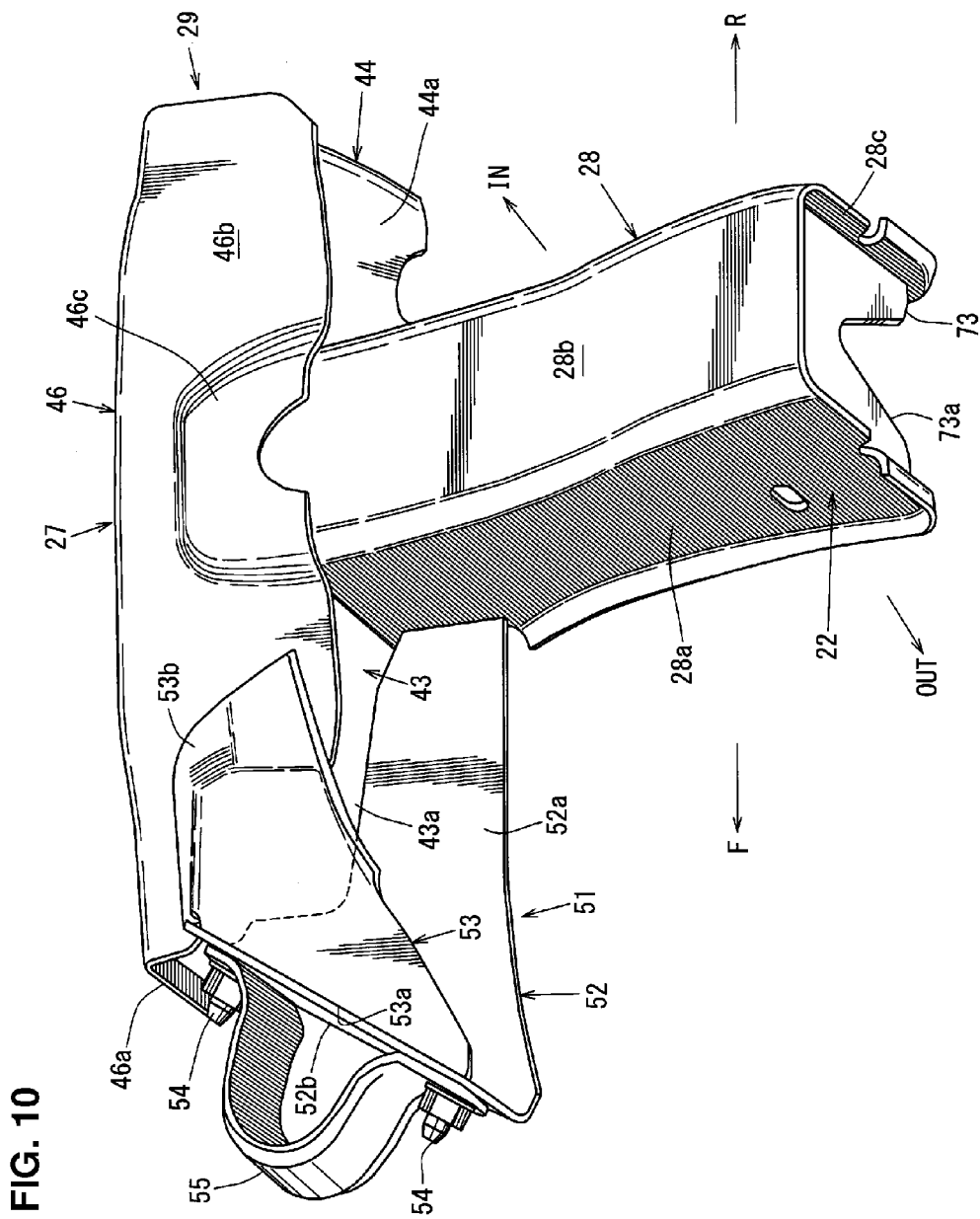
FIG. 10 is a perspective view showing structures of a tower portion and a pedestal for supporting a stabilizer.
Figure 11:
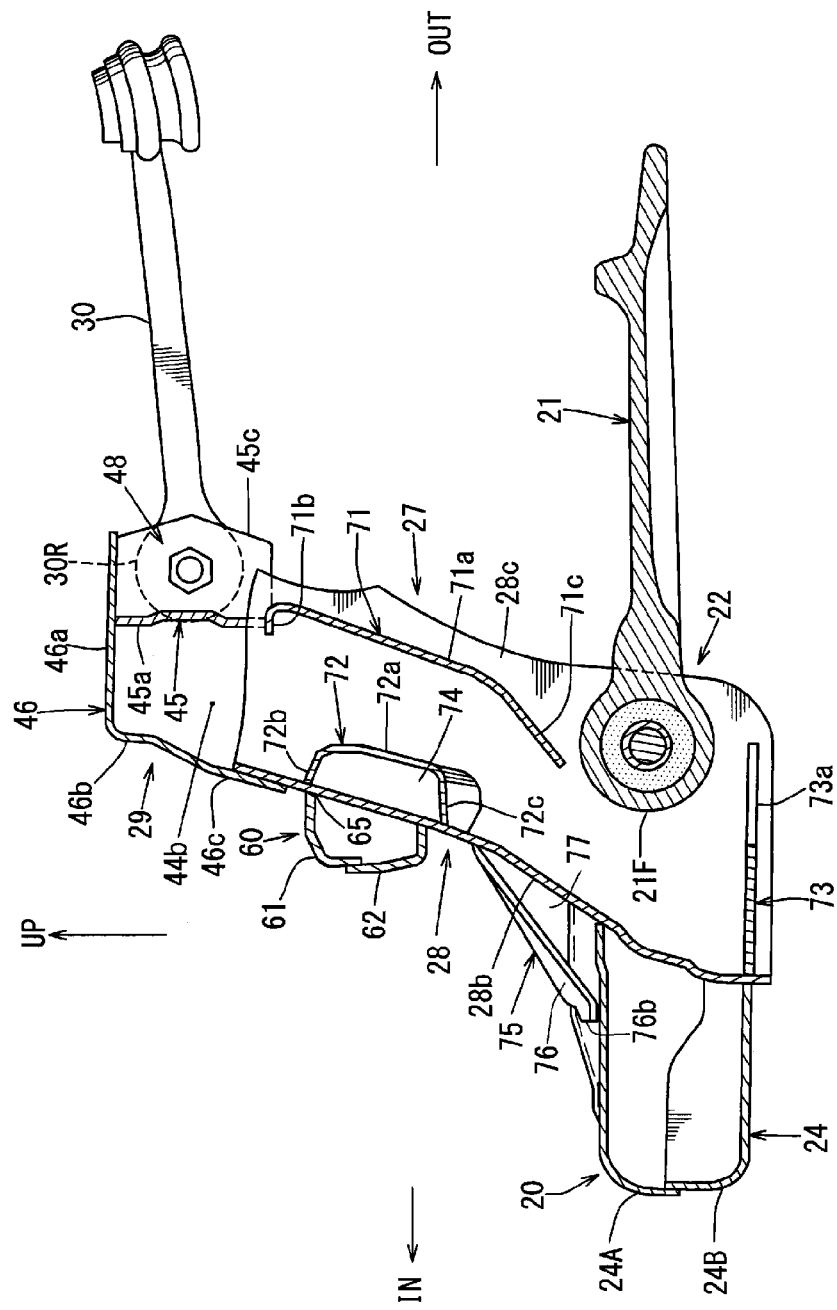
FIG. 11 is a sectional view taken along line C-C of FIG. 1.
Figure 12:
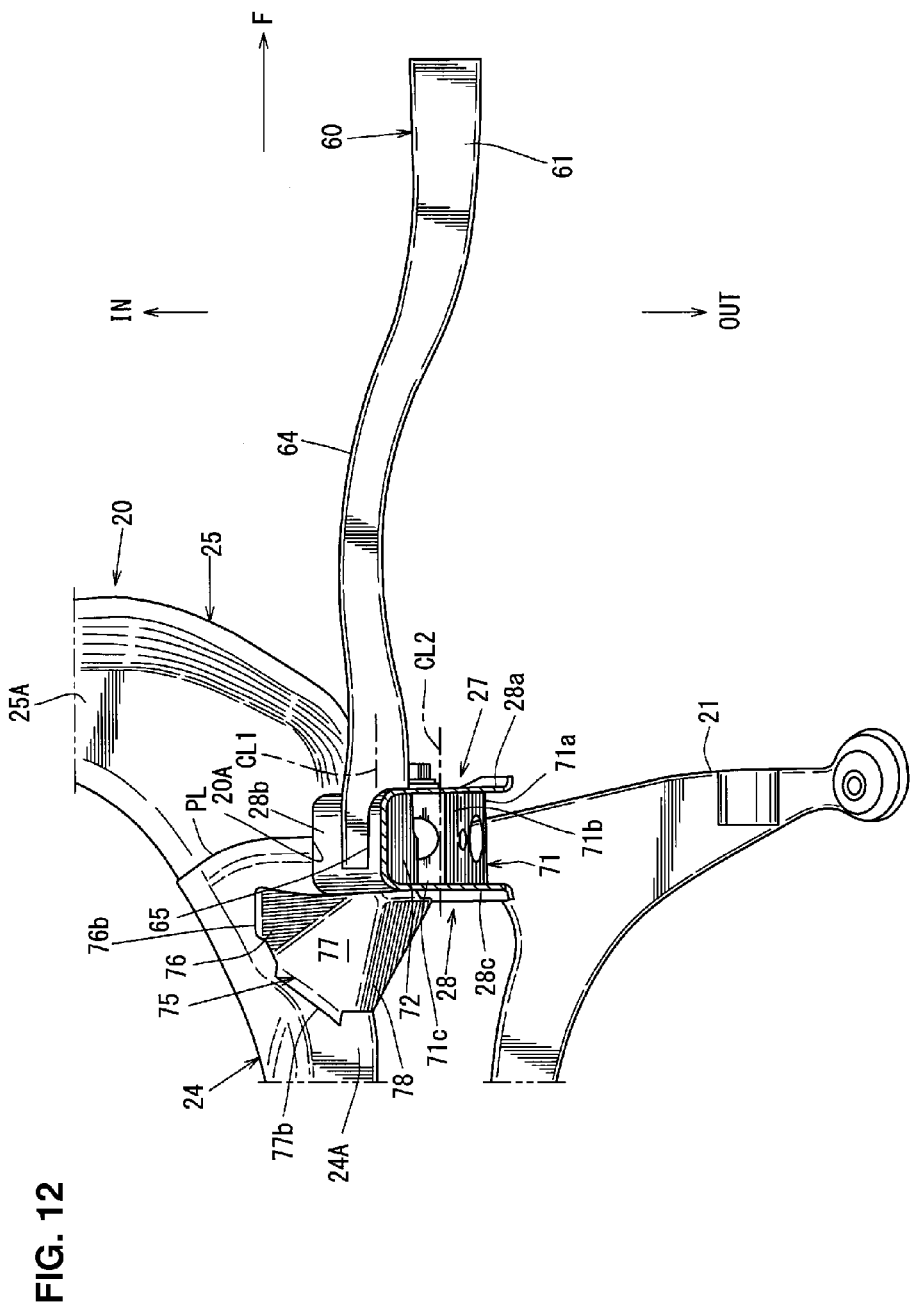
FIG. 12 is a plan view taken along line G-G of FIG. 5.
Figure 13:
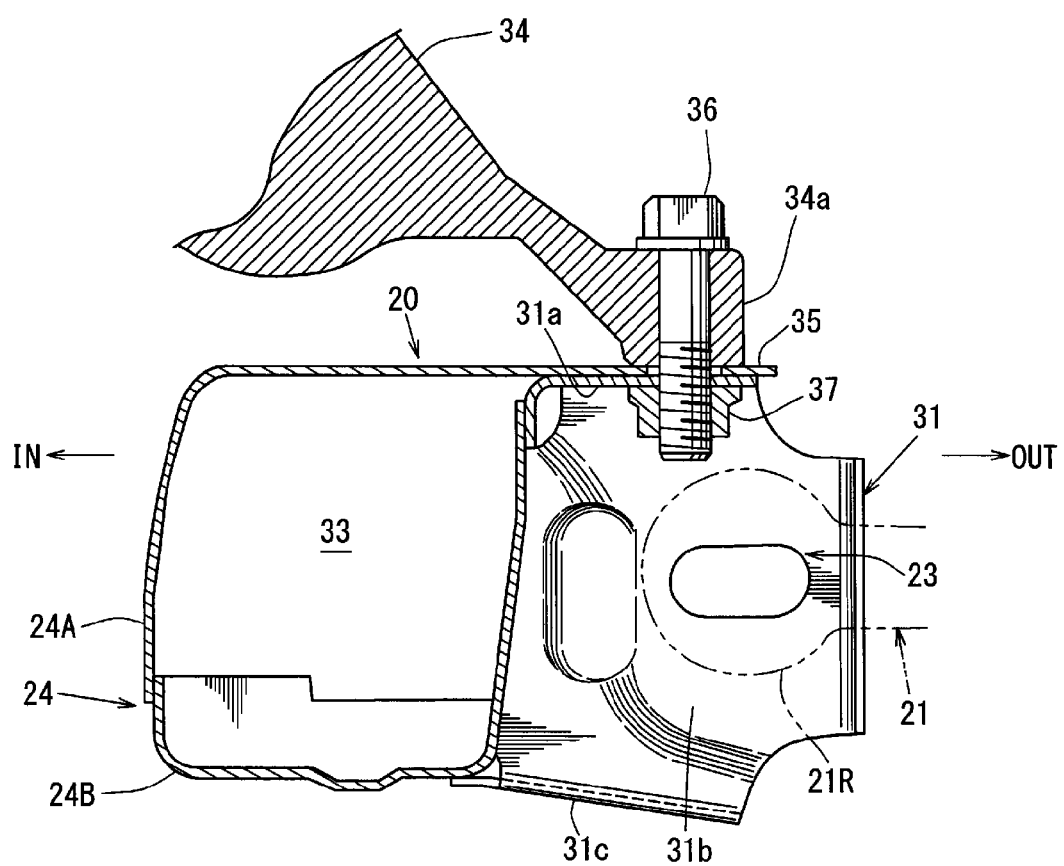
FIG. 13 is a major-part enlarged sectional view taken along line D-D of FIG. 1.

FIG. 10 is a perspective view showing structures of a tower portion and a pedestal for supporting a stabilizer, FIG. 11 is a sectional view taken along line C-C of FIG. 1, FIG. 12 is a plan view taken along line G-G of FIG. 5, FIG. 13 is a major-part enlarged sectional view taken along line D-D of FIG. 1, and FIG. 14 is a major-part enlarged sectional view taken along line E-E of FIG. 1.

The lower arm 21 has, as shown in FIG. 8, lower-arm pivots 21F, 21R at an inward side, in the vehicle width direction, thereof. The front-side lower-arm pivot 21F is pivoted at the attachment portion 22, and the rear-side lower-arm pivot 21R is pivoted at the attachment portion 23. The attachment portion 23 for the rear-side lower-arm pivot 21R is constituted by two brackets 31, 32 which are formed substantially in a Z shape in a side view as shown in FIGS. 1 and 2.

Herein, an outward portion, in the vehicle width direction, of the side portion 24 of the sub frame 20 is configured to extend substantially straightly in the vehicle longitudinal direction, a closed cross section 33 (see FIGS. 13 and 14) which is formed by the upper-side member 24A and the lower-side member 24B of the side portion 24 is configured to become smaller from a position attaching an engine mount 34 toward a position at its rear end, and a rear portion of the side portion 24 which is located rearward of the attachment position of the engine mount 34 is configured, as shown in FIGS. 13 and 14, such that a peak portion (eaves) 35 is formed by the upper-side member 24A only so as to extend outward, in the vehicle width direction, and opens downward. The above-described brackets 31, 32, as shown in FIG. 1, comprises upper wall portions 31a, 32a, vertical wall portions 31b, 32b, and lower wall portions 31c, 32c. As shown in FIG. 1, the both brackets 31, 32 are combined together integrally in the inverse-hat shape in the side view. The upper wall portions 31a, 32a of the respective brackets 31, 32 are fixedly fastened to a lower face portion of the peak portion 35.

Herein, as shown in FIG. 13, the upper wall portion 31a of the front-side bracket 31 is fastened jointly with an attachment leg portion 34a which is one of plural attachment leg portions 34a, 34b, 34c (see FIGS. 3 and 4) of the engine mount 34 with a fastening member, such as a bolt 36 and nut 37. As shown in FIG. 14, the upper wall portion 32a of the rear-side bracket 32 is fastened, with a long bolt 39 inserted from below, to a sleeve nut 38 which has been previously fixedly welded to the closed cross section 14 of the attaching pedestal lower 13 of the sub-frame attaching pedestal 10, jointly with the peak portion 35 and the attaching pedestal lower 13.

The engine mount 34 comprises the plural attachment leg portions 34a, 34b, 34c as shown in FIGS. 3 and 4, and the other attachment leg portions 34b, 34c are fixedly fastened to the side portion 24 of the sub frame 20 with fastening members 41, 42 as shown in the same figures. Bolt through holes 36a, 39a of the above-described bolts 36, 39 and fastening-member through holes 41a, 42a of the above-described fastening members 41, 42 are shown in FIGS. 6 and 7.

The closed cross section 33 of the side portion 24 of the sub frame 20 and the brackets 31, 32 constituting the rear-side attachment portion 23 of the lower arm 21 are arranged side by side in the vehicle width direction as shown in FIGS. 13 and 14. Thereby, both increasing of the sub-frame rigidity by means of the closed cross section 33 and ensuring of a connection space of the brackets 31, 32 can be attained within a limited width, in the vehicle width direction, of the side portion 24 of the sub frame 20.

Moreover, as shown in FIGS. 1 and 13, the leg portion 34a of the engine mount 34 and the upper wall portion 31a of the bracket 31 are jointly fastened to the peak portion 35 of the side portion 24 of the sub frame 20. Thereby, both ensuring of a connection space of the bracket 31 and reducing of the number of fastening members by means of joint fastening can be attained within a limited longitudinal length of the side portion 24 having a relatively short longitudinal length.

[Constitution of Tower Portion]

Herein, the above-described tower portion 27 comprising the pole portion 28 provided to stand at the side portion of the body portion 26 and the tower top portion 29 is configured as shown in FIGS. 5, 7, 9 and 10. That is, the above-described pole portion 28 is configured such that a U-shaped section opening outward for storing the front-side lower-arm pivot 21F of the lower arm 21 is formed by a front side portion 28a, an inward-side portion 28b, and a rear side portion 28c, and the above-described attachment portion 22 of a lower arm 21 is constituted by the U-shaped cross section of a lower portion of the pole portion 28. In other words, the lower portion of the pole portion 28 functions as a lower-arm front bracket.

The tower top portion 29 comprises, as shown in FIGS. 5, 7, 9 and 10, a front member 43 formed in an inverse-L shape in a side view, a rear member 44 which is positioned substantially longitudinally-symmetrically relative to the front member 43 and formed in an L shape in the side view, a center member 45 formed in a U shape opening outward in a plan view, and a sheet of upper member 46 which forms an upper wall and an inward side wall of the tower top portion 29.

As shown in FIGS. 5 and 9, the above-described front member 43 is formed integrally in the inverse-L shape in the side view by a lower wall portion 43a and a front wall portion 43b, and the above-described rear member 44 is formed integrally in the L shape in the side view by a lower wall portion 44a and a rear wall portion 44b. The front member 43 and the rear member 44 are fixed to the upper portion of the pole portion 23. Further, as shown in FIGS. 5 and 9, the above-described enter member 45 is formed integrally in the U shape in the plan view by a side wall portion 45a which is positioned on the inward side, a front wall portion 45b and a rear wall portion 45c which project outward, in the vehicle width direction, from front and rear sides of the side wall portion 45a. The center member 45 is fixed to the front member 43 and the rear member 44.

As shown in FIG. 8, the upper arm 30 (a so-called A-shaped arm) of the front-wheel suspension has upper-arm pivots 30F, 30R at an inward side, in the vehicle width direction, thereof. As shown in FIG. 5, a pivot support portion 47 which pivots the front-side upper-arm pivot 30F is constituted by the above-described front wall portions 43b, 45b, and a pivot support portion 48 which pivots the rear-side upper-arm pivot 30R is constituted by the above-described rear wall portions 45c, 44b.

Further, as shown in FIGS. 7 and 9, the above-described upper member 46 is formed integrally by an upper wall portion 46a, a side wall portion 46b, and a protrusion portion 46c. Herein, the upper wall portion 46a is positioned at the upper end of the tower top portion 29. The side wall portion 46b extends downward from an inward side of the upper wall portion 46a. The protrusion portion 46c protrudes inward, in the vehicle width direction, corresponding to the contour of the pole portion 28, at a central portion, in the longitudinal direction, of the side wall portion 46b. The above-described upper member 46 is fixed to the front member 43, the rear member 44, the center member 45, and the pole portion 28, respectively.

[Support Structure of Stabilizer]

Meanwhile, as shown in FIGS. 2, 3, 4 and 6, there is provided a stabilizer 50 having a torsional rigidity operative to restrain the vehicle from rolling improperly greatly when the vehicle's one-side (right-side or left-side) wheels go up (bump) or go down (rebound). This stabilizer 50 extends in the vehicle width direction and bends rearward from both-end portions of its central portion, and each of its both end portions 50a is attached to an upper portion of an outward end portion of the lower arm 21 via a control link, not illustrated.

As shown in FIG. 2, the stabilizer 50 is supported at the tower portion 27 at the level which corresponds to the front side frame 18 at the both-end portions of the central portion thereof. Accordingly, the support structure of the stabilizer 50 will be described referring to FIGS. 5-10. As shown in FIG. 5, a pedestal 51 for supporting the stabilizer 50 is provided forward of the upper end portion of the tower portion 27 and at the level which overlaps, in a vertical direction, an extension member 60, which will be described later, at its lower-side portion. As shown in the same figure, this stabilizer-support pedestal 51 is configured such that its more-than-half part is arranged above the extension member 60.

As shown in FIGS. 9 and 10, the stabilizer-support pedestal 51 is comprised of an outside pedestal 52 which is located on its outward side and an inside pedestal 53 which is located on its inward side, which are fixedly welded to each other.

As shown in FIGS. 9 and 10, the outside pedestal 52 extends longitudinally, and comprises a side portion 52a having a front end portion which is configured to be wider than the other part and a pedestal face portion 52b which is formed by being integrally bent inward from a front end of the side portion 52a. The pedestal face portion 52b is configured to slant forward and downward.

Herein, as shown in FIGS. 5, 9 and 10, the side portion 52a of the outside pedestal 52 is fixedly welded to a front face of the front wall portion 43b and the lower wall portion 43a of the front member 43 of the tower top portion 29, and also to the front side portion 28a of the pole portion 28. Further, a stabilizer support member 55 (a so-called stabilizer plate) is attached to upper-and-lower positions of the pedestal face portion 52b of the outside pedestal 52 by means of two pairs of attaching members 54, 54, such as bolt and nut, so that a specified position (the both-end portions of the central portion) of the stabilizer 50 which is located near the end portion of the stabilizer 50 is supported by the stabilizer support member 55 via a stabilizer bush 55B (see FIGS. 1 and 6).

The above-described inside pedestal 53 is, as shown in FIG. 10, fixedly welded to a back face of the pedestal face portion 52b of the outside pedestal 52 at its front end portion 53a which is configured to slant forward and downward, and also fixedly welded to the side wall portion 46b of the upper member 46 of the tower top portion 29 at its flange portion 53b which is configured to be continuous from an upper end portion of the inside pedestal 53 to a rear end portion of the inside pedestal 53. That is, the above-described stabilizer-support pedestal 51 is joined between the pivot support portion 47 of the tower top portion 29 and the pole portion 28 of the tower portion 27 of the sub frame 20 so that the rigidity of the tower portion 27 can be increased.

[Constitution of Extension Member]

As shown in FIGS. 5, 6 and 7, there are provided a pair of right-and-left extension members 60 which extend forward from respective middle portions, in a height direction, of the tower portions 27 of the sub frame 20. This extension member 60 is, as shown in FIGS. 6 and 7, a member having a closed cross section 63 extending substantially in the vehicle longitudinal direction, which is comprised of an upper member 61 having a U-shaped cross section opening downward and a lower member 62 having a U-shaped cross opening upward which are jointly fixed to each other.

Specifically, the above-described extension member 60 is connected to the pole portion 28 by welding at its rear end portion, and extends forward below the front side frame 18 (see FIG. 1). The extension member 60 projects forward from its rear end portion in such a manner that its center line bends inward, in the vehicle width direction, first so as to avoid the stabilizer support pedestal 51, and then bends outward, in the vehicle width direction, from this inward-bending portion 64. This extension member 60 is configured to deform and absorb an impact at a vehicle frontal collision, in cooperation with the above-described front side frame 18.

More specifically, as shown in FIGS. 7 and 12, the extension member 60 is joined to the pole portion 28 so that a center line CL1 of a longitudinal direction of the extension member 60 at the rear end portion is located at an inward position, in the vehicle width direction, relative to a center line CL2 of a standing-vertical direction of the tower portion 28. Accordingly, the tower portion 27 is twisted when the vehicle-frontal collision load is inputted, which causes the extension member 60 to bend inward, in the vehicle width direction, at its inward-bending portion 64 (i.e., its front portion which projects forward from its rear end portion, bending inward), not to get broken at its rear end portion (i.e., a root portion). Thus, twisting of the tower portion 27 surely causes inward-bending of the inward-bending portion 64 of the extension member 60 regardless of the collision manner.

In the present embodiment, as shown in FIGS. 4, 6, 7 and 12, the rear end portion of the extension member 60 has a cut-out portion 65 at an outward side, in the vehicle width direction, thereof and this cut-out portion 65 is made contact and welded to both the front side portion 28a and the inward-side portion 28b of the above-described portion having the U-shaped cross section of the pole portion 28 of the tower portion 27. Thus, the length of the welding line is made properly long, so that it is surely prevented that the extension member 60 gets broken at the rear end portion because of welding-apart, and the above-described inward-bending of the extension member 60 at the inward-bending portion 64 is ensured.

Further, as shown in the plan view of FIG. 12, the closed cross section 63 of the extension member 60 is configured such that the size thereof is great at the rear end portion of the extension member 60, then becomes narrow toward the above-described inward-bending portion 64, and becomes great again at the portion which projects forward, bending outward. That is, the closed cross section 63 of the extension member 60 is configured such that the size thereof is the smallest at the inward-bending portion 64. Thus, the above-described inward-bending of the extension member 60 at the vehicle frontal collision is promoted.

Herein, the extension member 60 is configured such that the size thereof at the inward-bending portion 64 is narrow in the plan view, but the vertical width thereof is substantially the same over its whole length from its rear end to its front end as shown in the side view of FIGS. 1 and 5. Also, the extension member 60 is configured to extend substantially horizontally from its rear end to its front end at a position below the front side frame 18 as shown in FIG. 1.

In other words, the extension member 60 is configured as shown in FIG. 1, such that it extends substantially horizontally from its rear end to its front end, and its rear portion does not bend downward.

[Connection Structure of Front Side Frame and Extension Member]

As shown in FIGS. 1-4, a pair of set plates 66 are attached to respective front end portions of the above-described pair of right-and-left front side frames 18, and a connecting plate 67 extending in the vehicle width direction is provided to extend between respective front end portions of the pair of right-and-left extension members 60. A lower-end bending portion 66a of the set plate 66 and an upper-end bending portion 67a of the connecting plate 67 which corresponds to a front-end position of the extension member 60 are fixedly fastened to each other with a fastening member 68, such as bolt and nut. A sub crash can 70 is attached to the front end portion of the extension member 60 via the connecting plate 67 and a bracket 69. A main crash can, not illustrated, is attached to the front end portion of the front side frame 18 via the set plate 66 and a bracket. As shown in the side view of FIG. 1, respective front ends of the front side frame 18 and the extension member 60 are positioned so that both of them can start deforming concurrently after the main crash can (not illustrated) and the sub crash can have crushed at the vehicle frontal collision. Herein, the above-described connecting plate 67 may be configured to be split into plural parts in the vehicle width direction.

[Constitution of Plate Members Inside Tower Portion]

Herein, as shown in FIGS. 5, 9 and 11, three plate members 71, 72, 73 are fixed inside the pole portion 28 having the U-shaped cross section of the tower portion 27 of the sub frame 20. These plate members 71, 72, 73 are provided to extend between the front side portion 28a and the rear side portion 28c of the pole portion 28 as shown in FIG. 5. The plate member 71 (a first plate member) is provided on the open side of the pole portion 28 having the U-shaped cross section as shown in FIG. 11, and comprises a vertical wall portion 71a which extends vertically and upper-and-lower bending portions 71b, 71c which bend inward, in the vehicle width direction, from upper-and-lower ends of the vertical wall portion 71a. The plate members 71, 72, 73 can increase the rigidity of the pole portion 28.

The plate member 72 (a second plate member) is provided inside the pole portion 28 at a position corresponding to the level of the rear end portion of the extension member 60, and comprises a vertical wall portion 72a which extends vertically and upper-and-lower wall portions 72b, 72c which bend inward from upper-and-lower ends of the vertical wall portion 72a. The upper-and-lower wall portions 72b, 72c are jointly welded to the inward-side portion 28b of the pole portion 28, so that a closed cross section 74 extending longitudinally is formed between the inward-side portion 28b and the plate member 72. The above-described vertical wall portion 72a is configured such that the vertical width of its rear end portion is wider than that of its front end portion, and the above-described lower wall portion 72c slants in such a manner that its front portion is located at a higher level than its rear portion, so that the input load from the extension member 60 at the vehicle frontal collision is transmitted rearward (see FIG. 5). The plate member 73 (a third plate member) is provided at a bottom portion inside the pole portion 28 having the U-shaped cross section, and this plate member 73 is a so-called V-letter plate which has a V-shaped groove 73a at its longitudinally-middle portion on the outward side.

[Vehicle-Frontal-Collision Load Transmission Structure]

Further, as shown in FIGS. 4, 5 and 12, there is provided a gusset member 75 which interconnects the rear side portion 28c of the pole portion 28 of the tower portion 27 and a portion of the upper-side member 24A of the side portion 24 of the sub frame 20 which is located right behind the split line PL. Herein, the gusset member 75 is configured such that an upper side of its front portion overlaps the plate member 72 in the vertical direction as shown in FIGS. 4 and 12 and also overlaps the rear end portion of the extension member 60 in the vehicle width direction.

As shown in FIG. 5, the rear portion of the extension member 60, the plate member 72 provided inside the pole portion 28, and the gusset member 75 provided behind the tower portion 27 are arranged in line obliquely rearward and downward so as to transmit the vehicle-frontal-collision load to the sub frame 20 properly through these members.

Figure 15:
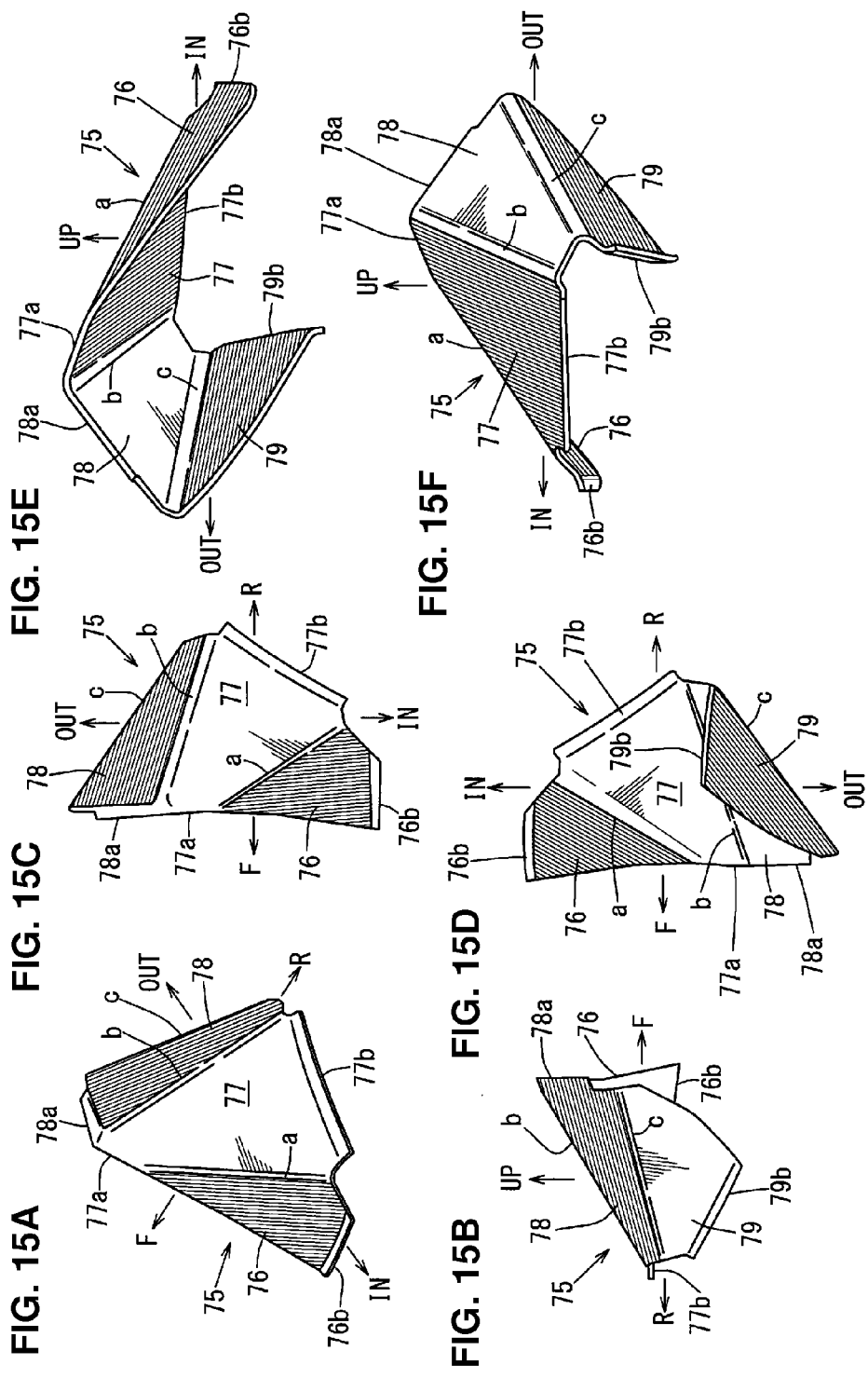
FIGS. 15A, B, C, D, E and F show a gusset member.
FIG. 15B being a side view.
FIG. 15C being a plan view.
FIG. 15D being a bottom view.
FIG. 15E being an elevational view.
FIG. 15F being a back view.

FIGS. 15A-F show the gusset member 75 itself, and FIG. 15A is a perspective view of the gusset member 75, FIG. 15B is a side view of the gusset member 7, FIG. 15C is a plan view of the gusset member 75, FIG. 15D is a bottom view of the gusset member 75, FIG. 15E is an elevational view of the gusset member 75, and FIG. 15F is a back view of the gusset member 75.

As shown in FIGS. 15A-F, the gusset member 75 is a structure having four faces, which comprises a substantially-triangular inside wall 76 which is positioned on the inward side in the vehicle width direction, a substantially-triangular rear wall 77 which is provided beside the inside wall 76 via a ridge line a, an inverse-trapezoidal outside wall 78 which is provided beside the rear wall 77 via a ridge line b on the outward side in the vehicle width direction, and a substantially-triangular vertical wall 79 which is provided vertically beside the outside wall 78 via a ridge line c, which are formed integrally.

As shown in FIGS. 5, 6, 7 and 12, an upper end portion 77a of the rear wall 77 and an upper end portion 78a of the outside wall 78 are fixedly welded to the rear side portion 28c of the pole portion 28 having the U-shaped cross section of the tower portion 27, and a lower portion 76b of the inside wall 76, a lower portion 77b of the rear wall 77, and a lower portion 79b of the vertical wall 79 are fixedly welded to the upper-side member 24A of the side portion 24 of the sub frame 20. Herein, in the figures, an arrow F shows a vehicle front direction, an arrow R shows a vehicle rear direction, an arrow IN shows a vehicle inward direction, an arrow OUT shows a vehicle outward direction, and an arrow UP shows a vehicle upward direction.

The embodiment shown in the figures are configured described above, and the operations of the present embodiment will be described. The front side frame 18 and the extension member 60 start deforming concurrently after the main crash can (not illustrated) and the sub crash can 70 which are provided at the respective front ends of these member 18, 60 have crushed at the vehicle frontal collision, so that these members 18, 60 jointly deform and absorb the impact of the collision.

Figure 16:
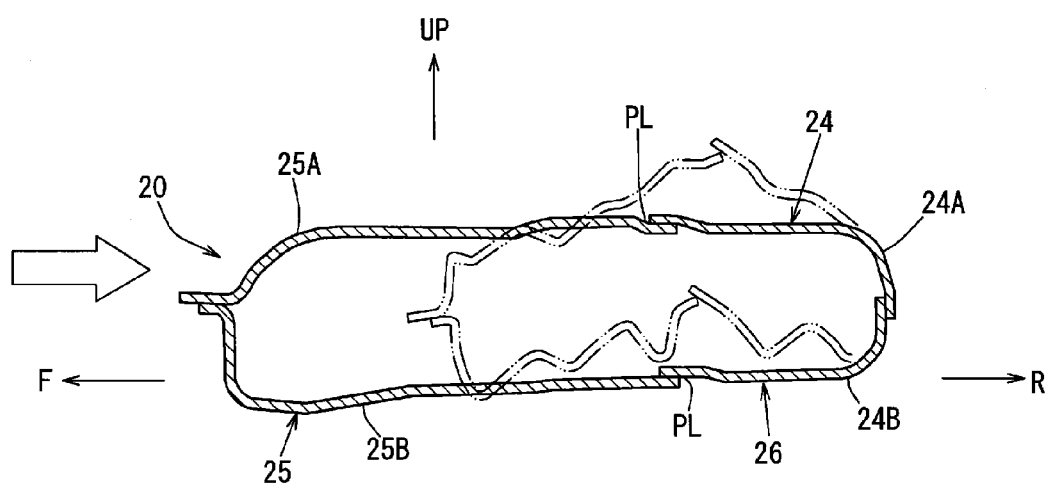
FIG. 16 is an explanatory diagram showing a deformation state of a sub frame at a vehicle frontal collision.

In this case, the connecting of the extension member 60 is configured such that the center line CL1 of the longitudinal direction of the extension member 60 at the rear end portion is located at the inward position, in the vehicle width direction, relative to the center line CL2 of the standing-vertical direction of the tower portion 27 as shown in FIG. 12, and the cut-out portion 65 is made contact and welded to both the front-side portion 28a and the inward-side portion 28b of the pole portion 28 of the tower portion 27. Accordingly, the tower portion 27 is twisted when the vehicle-frontal collision load is inputted, which causes the extension member 60 to bend inward, in the vehicle width direction, at its inward-bending portion 64, not to get broken at its rear end portion or not to be apart at its welding portion. Thus, the inward-bending of the extension member 60 is ensured regardless of the collision manner, thereby absorbing the collision impact. Moreover, the split line PL of the side portion 24 and the front side portion 25 of the sub frame 20 matches the position of the attachment portion 22 of the lower arm 21 as shown in FIGS. 5 and 12. Accordingly, the sub frame 20 is surely made crush in such a manner the split line PL moves upward as shown by imaginary lines in FIG. 16 from its normal state shown by solid lines so as to absorb the collision impact.

As described above, the vehicle-body front structure of the present embodiment comprises the front side fames 18 which extend in the vehicle longitudinal direction at the right and left sides of the engine room 1, projecting forward from the vehicle-compartment portion (see the dash lower panel 3), the sub frame 20 which is provided at the bottom portion of the engine room 1 and comprises the body portion 26, which is comprised of the right-and-left side portions (see the side portions 24) constituting the attachment portions 22, 23 of the lower arms of the front-wheel suspension and the front side portion 25 interconnecting the right-and-left side portions (the side portions 24) in the vehicle width direction, and the right-and-left tower portions 27 which are provided to stand substantially vertically at the right and left sides of the body portion 26, and the stabilizer 50 provided forward of the tower portions 27. Herein, the tower portions 27 are fastened to the respective lower face portions of the front side frames 18 at the respective upper end portions. Further, each of the tower portions 27 comprises the pole portion 28 which extends substantially vertically and the tower top portion 29 which is positioned at the upper portion of the pole portion 28 and projects from the pole portion 28 longitudinally along the front side frame 18, constituting the upper-arm attachment portion (see the pivot support portions 47, 48) of the front-wheel suspension, and the stabilizer-support pedestal 51 supporting the stabilizer 50 is provided to be connected to the pole portion 28 and the tower top portion 29 (see FIGS. 1, 5 and 10).

According to this structure, since the stabilizer-support pedestal 51 supporting the stabilizer 50 is provided to be connected to the pole portion 28 and the tower top portion 29, the pole portion 28 of the sub frame 20 can be properly reinforced by using the stabilizer-support pedestal 51, so that the rigidity of the upper portion of the pole portion 28 can be properly increased.

According to the embodiment of the present invention, the vehicle-body front structure further comprises the pair of right-and-left extension members 60 which are configured to be joined to the respective middle portions, in the height direction, of the tower portions 27 of the sub frame 20 at the respective rear end portions thereof and to project forward at the level below the front side frames 18 so as to deform and absorb the impact at the vehicle frontal collision, in cooperation with the front side frames 18, and the stabilizer-support pedestal 51 is arranged above the extension member 60 and the pedestal face (see the pedestal face portion 52b) of the stabilizer-support pedestal 51 is configured to face obliquely upward (see FIGS. 5 and 7).

According to this structure, a resistant force against the vehicle-frontal collision can be improved by using both the front side frame 18 and the extension member 60. Further, even in the case in which the extension member 60 is configured to be joined to the middle portion, in the height direction, of the tower portion 27 at the rear end portion thereof and project forward at the level below the front side frame 18, since the stabilizer-support pedestal 51 is arranged above the extension member 60 and the pedestal face (see the pedestal face portion 52b) is configured to face obliquely upward, the stabilizer 50 can be supported at the upper side of the pedestal face (the pedestal face portion 52b). Accordingly, the stabilizer 50 can be properly arranged without interfering with the extension member 60.

Further, according to the embodiment of the present invention, the tower top portion 29 of the tower portion 27 comprises the front member 43 which has the L shape in the side view, the rear member 44 which is positioned substantially symmetrically relative to the front member 43, the center member 45 which has the U shape in the plan view which opens outward, in the vehicle width direction, and the upper member 46 which constitutes the upper wall and the inward side wall, in the vehicle width direction, of the tower top portion 29, and the upper member 46 of the tower top portion 29 has the upper wall portion 46a positioned at the upper end of the tower top portion 29 and the side wall portion 46b extending downward from the inward side of the upper wall portion 46a, which is made of a sheet of panel (see FIGS. 5, 9 and 10).

According to this structure, the storage portion (see the pivot support portions 47, 48) of the upper-arm pivots 30F, 30R of the front-wheel suspension can be formed by the minimum required members, i.e., the front member 43, the rear member 44, the center member 45, and the upper member 46. In particular, since the upper member 46 has the upper wall portion 46a and the side wall portion 46b, which is made of a sheet of panel, the attachment rigidity of the upper arm 30 can be ensured properly, reducing the parts number or assembling steps.

The vehicle-compartment portion of the present invention corresponds to the dash lower panel 3 of the present embodiment. Likewise, the attachment portion of the lower arm 21 corresponds to the attachment portions 22, 23, the right-and-left side portions correspond to the side portion 24, the upper-arm attachment potion corresponds to the pivot support portions 47, 48, and the pedestal face corresponds to the pedestal face portion 52b.

The present invention should not be limited to the above-described embodiment, and any other modifications or improvements may be applied within the scope of the claimed invention.

What is claimed is:

1. A vehicle-body front structure, comprising:
a pair of right-and-left front side frames extending in a vehicle longitudinal direction at respective right and left sides of an engine room, projecting forward from a vehicle-compartment portion;
a sub frame provided at a bottom portion of the engine room, the sub frame comprising a body portion which is comprised of right-and-left side portions and a front side portion and a pair of right-and-left tower portions, the right-and-left side portions constituting right-and-left attachment portions of right-and-left lower arms of a front-wheel suspension, the front side portion interconnecting the right-and-left side portions in a vehicle width direction, the pair of tower portions of the sub frame being provided to stand substantially vertically at right and left sides of the body portion and fastened to respective lower face portions of the pair of front side frames at respective upper end portions thereof; and
a stabilizer provided forward of the pair of tower portions,
wherein each of said tower portions comprises a pole portion extending substantially vertically and a tower top portion positioned at an upper portion of each pole portion and projecting from each pole portion longitudinally along respective each of said pair of front side frames, constituting an attachment portion of an upper arm of the front-wheel suspension, and
a pedestal for supporting said stabilizer is provided to be directly connected to both of said each pole portion and said each tower top portion.

2. The vehicle-body front structure of claim 1, wherein said each tower top portion of each tower portion of the sub frame comprises a front member which has an L shape in a side view, a rear member which is positioned substantially symmetrically relative to the front member, a center member which has a U shape in a plan view which opens outward, in a vehicle width direction, and an upper member which constitutes an upper wall and an inward side wall, in the vehicle width direction, of each tower top portion,
said each upper member of each tower top portion has an upper wall portion positioned at an upper end of each tower top portion and a side wall portion extending downward from an inward side of each upper wall portion, and made of a sheet of panel, and
said stabilizer-support pedestal is provided to be directly connected to three of said pole portion, the side wall portion of the upper member of said tower top portion, and the front member of said tower top portion.

3. A vehicle-body front structure, comprising:
a pair of right-and-left front side fames extending in a vehicle longitudinal direction at right and left sides of an engine room, projecting forward from a vehicle-compartment portion;
a sub frame provided at a bottom portion of the engine room, the sub frame comprising a body portion which is comprised of right-and-left side portions and a front side portion and a pair of right-and-left tower portions, the right-and-left side portions constituting right-and-left attachment portions of right-and-left lower arms of a front-wheel suspension, the front side portion interconnecting the right-and-left side portions in a vehicle width direction, the pair of tower portions of the sub frame being provided to stand substantially vertically at right and left sides of the body portion and fastened to respective lower face portions of the pair of front side frames at respective upper end portions thereof; and
a stabilizer provided forward of the pair tower portions,
wherein each of said tower portions comprises a pole portion which extends substantially vertically and a tower top portion which is positioned at an upper portion of the pole portion and projects from the pole portion longitudinally along said front side frame, constituting an attachment portion of an upper arm of the front-wheel suspension,
a pedestal for supporting said stabilizer is provided to be connected to said pole portion and said tower top portion,
there are provided a pair of right-and-left extension members which are configured to be joined to respective middle portions, in a height direction, of said pair of tower portions of the sub frame at respective rear end portions thereof and to project forward at a level below said pair of front side frames so as to deform and absorb an impact at a vehicle frontal collision, in cooperation with the pair of front side frames, and said stabilizer-support pedestal is arranged above the extension member and an pedestal face of the stabilizer-support pedestal is configured to face obliquely upward.

4. The vehicle-body front structure of claim 3, wherein said each tower top portion of each tower portion of the sub frame comprises a front member which has an L shape in a side view, a rear member which is positioned substantially symmetrically relative to the front member, a center member which has a U shape in a plan view which opens outward, in a vehicle width direction, and an upper member which constitutes an upper wall and an inward side wall, in the vehicle width direction, of each tower top portion, and said each upper member of each tower top portion has an upper wall portion positioned at an upper end of each tower top portion and a side wall portion extending downward from an inward side of each upper wall portion, and made of a sheet of panel.

5. A vehicle-body front structure, comprising:

a pair of right-and-left front side fames extending in a vehicle longitudinal direction at right and left sides of an engine room, projecting forward from a vehicle-compartment portion;

a sub frame provided at a bottom portion of the engine room, the sub frame comprising a body portion which is comprised of right-and-left side portions and a front side portion and a pair of right-and-left tower portions, the right-and-left side portions constituting right-and-left attachment portions of right-and-left lower arms of a front-wheel suspension, the front side portion interconnecting the right-and-left side portions in a vehicle width direction, the pair of tower portions of the sub frame being provided to stand substantially vertically at right and left sides of the body portion and fastened to respective lower face portions of the pair of front side frames at respective upper end portions thereof; and a stabilizer provided forward of the pair tower portions, wherein each of said tower portions comprises a pole portion which extends substantially vertically and a tower top portion which is positioned at an upper portion of the pole portion and projects from the pole portion longitudinally along said front side frame, constituting an attachment portion of an upper arm of the front-wheel suspension, there is provided a pedestal for supporting said stabilizer, which comprises a pedestal face portion supporting the stabilizer, an outside pedestal portion extending rearward from an outward end of the pedestal face portion, and an inside pedestal portion extending rearward from an inward end of the pedestal face portion such that the pedestal for supporting the stabilizer is configured to have substantially a U-shaped cross section, and at least one of the outside pedestal portion and the inside pedestal portion of said pedestal for supporting the stabilizer is directly connected to both of said pole portion and said tower top portion of the tower portion.

* * * * *